(12) United States Patent
Schwarz et al.

(10) Patent No.: US 10,516,639 B2
(45) Date of Patent: Dec. 24, 2019

(54) AGGREGATED NOTIFICATION FEEDS

(71) Applicant: Facebook, Inc., Menlo Park, CA (US)

(72) Inventors: Alon Schwarz, Tel Aviv (IL); Blaise A. DiPersia, San Francisco, CA (US); Gahl Saraf, Bat Hefer (IL); Masha Gutman, Tel Aviv (IL)

(73) Assignee: Facebook, Inc., Menlo Park, CA (US)

( * ) Notice: Subject to any disclaimer, the term of this patent is extended or adjusted under 35 U.S.C. 154(b) by 173 days.

(21) Appl. No.: 15/642,250

(22) Filed: Jul. 5, 2017

(65) Prior Publication Data
US 2019/0014069 A1 Jan. 10, 2019

(51) Int. Cl.
| | |
|---|---|
| *H04L 12/58* | (2006.01) |
| *H04L 29/06* | (2006.01) |
| *G06F 16/954* | (2019.01) |
| *H04L 29/08* | (2006.01) |
| *G06F 3/0482* | (2013.01) |
| *G06F 16/35* | (2019.01) |
| *G06Q 50/10* | (2012.01) |
| *G06F 16/38* | (2019.01) |
| *G06Q 50/00* | (2012.01) |

(52) U.S. Cl.
CPC ............ *H04L 51/16* (2013.01); *G06F 3/0482* (2013.01); *G06F 16/954* (2019.01); *H04L 51/24* (2013.01); *H04L 51/32* (2013.01); *H04L 67/306* (2013.01); *G06F 16/35* (2019.01); *G06F 16/38* (2019.01); *G06Q 50/01* (2013.01); *G06Q 50/10* (2013.01); *H04L 63/104* (2013.01)

(58) Field of Classification Search
CPC ..... G06Q 50/01; G06F 16/285; G06F 16/287; G06F 16/24578; G06F 16/335; G06F 16/35; G06F 3/0482; G06F 16/25; G06F 16/38; H04L 51/32; H04L 67/306; H04L 51/36; H04L 51/24; H04L 63/104; G04L 51/16
See application file for complete search history.

(56) References Cited

U.S. PATENT DOCUMENTS

| | | | |
|---|---|---|---|
| 2012/0143972 A1* | 6/2012 | Malik | ..................... H04L 51/36 709/206 |
| 2013/0298038 A1* | 11/2013 | Spivack | ................ H04L 65/403 715/753 |
| 2014/0344718 A1* | 11/2014 | Rapaport | ................ H04L 51/32 715/753 |

(Continued)

*Primary Examiner* — Tom Y Chang
(74) *Attorney, Agent, or Firm* — FisherBroyles, LLP

(57) ABSTRACT

Embodiments are described for generating an aggregated notifications feed that organizes notifications into groups of notification thread types. Various notifications in a social media network can be associated with a notification thread, and notification threads can be assigned a thread category. An aggregated notifications feed can be used to provide a user interface with notifications grouped under a corresponding thread category. Grouped notifications can be ordered in several ways such as in reverse chronologic order providing for more relevant notifications to be presented first. This notification ordering can be within a group or can be among groups based on the most recent notification within that group. In some implementations, grouping notifications or ordering notifications can be based on additional parameters such as user preferences, rules obtained for machine learning, or administrator settings.

20 Claims, 9 Drawing Sheets

(56) References Cited

U.S. PATENT DOCUMENTS

2015/0186494 A1* 7/2015 Gilad ................... H04L 51/22
  707/740
2016/0028875 A1* 1/2016 Brown ................ G06F 3/0481
  715/751

\* cited by examiner

AGGREGATED NOTIFICATION FEEDS

BACKGROUND

The Internet has made it possible for people to connect and share information in ways previously undreamt of. Social media platforms, for example, enable people to collaborate on ideas, discuss current events, or just share what they had for lunch. In fact, social networking has become one of the dominant ways people gather information and communicate.

As the popularity of social networking has grown, social networking sites have attracted billions of users across the world. These users spend an immense amount of time interacting with content on social media websites. On one popular social media website, for example, active users spend a total of over 120 million hours each year interacting with the website. These users can often produce hundreds of millions of posts, likes, mentions, and other content each day.

Providing the content that users are likely to find helpful or relevant increases the chances that users will interact with that content and that they will return to the website in the future. One way some social networking sites have done this is through notifications of available content or of other user actions. For example, a user can receive notifications when another "friend" user posts content, sends the user a message, has a birthday, or other events that the user may find of interest. However, providing too many notifications or providing notifications in a format that is not easily digestible for users can make users feel overwhelmed or make it difficult for them to identify notifications that they want to investigate. Any such barrier to reaching relevant content prevents users from being fully engaged, which may cause them to navigate to a different site. Therefore, determining which notifications to select and providing them in format that users will find useful is desirable to increase user engagement and web traffic.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Embodiments are described for generating an aggregated notifications feed that organizes notifications into groups of notification thread types. An aggregated notifications feed can be used to provide a user interface with notifications grouped under a corresponding thread notification category. Grouped notifications can be ordered in the aggregated notifications feed, e.g. temporally, providing for more relevant notifications to be presented first.

Notifications can relate to one or more content items or events in a social network. Content items can be any digital data such as text, images, audio, video, links, webpages, minutia (e.g. indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc.

In some implementations, various notifications in a social media network can be associated with a notification thread, and notification threads can be assigned a thread category. When generating an aggregated notifications feed, notifications can be grouped on various thread categories, such as a category for notifications of content items that are part of an identified conversation, a category for notifications of a new content item post, a "mentions" category for notifications of a user being identified or selected in a content item, an "other" category for notifications of other activity, or other notification categories. Furthermore, grouped notifications can be ordered in several ways such as in reverse chronologic order within a group or ordering among groups based on the most recent notification within that group. In some implementations, grouping notifications or ordering notifications can be based on additional parameters such as user preferences, rules obtained from machine learning, or administrator settings.

The disclosed technology for generating and providing an aggregated notifications feed improves social networks and other technologies that use notifications, such as where content items can be generated or activities can occur outside a user's active interface. Presently, notifications are typically presented as a long sequence, regardless of any category or type of each notification. The disclosed technology provides a more useful user interface for presenting notifications. This improved logical organization by notification threads increases users' ability to retrieve and understand notifications. Furthermore, by providing this improved logical organization, users are more likely to be able to directly navigate to content items of interest, reducing the load on the social networks that would otherwise be required to generate multiple pages of information as users drill in two various other feeds (e.g. their "wall," "events page," "news feed," etc.).

Figure 1:
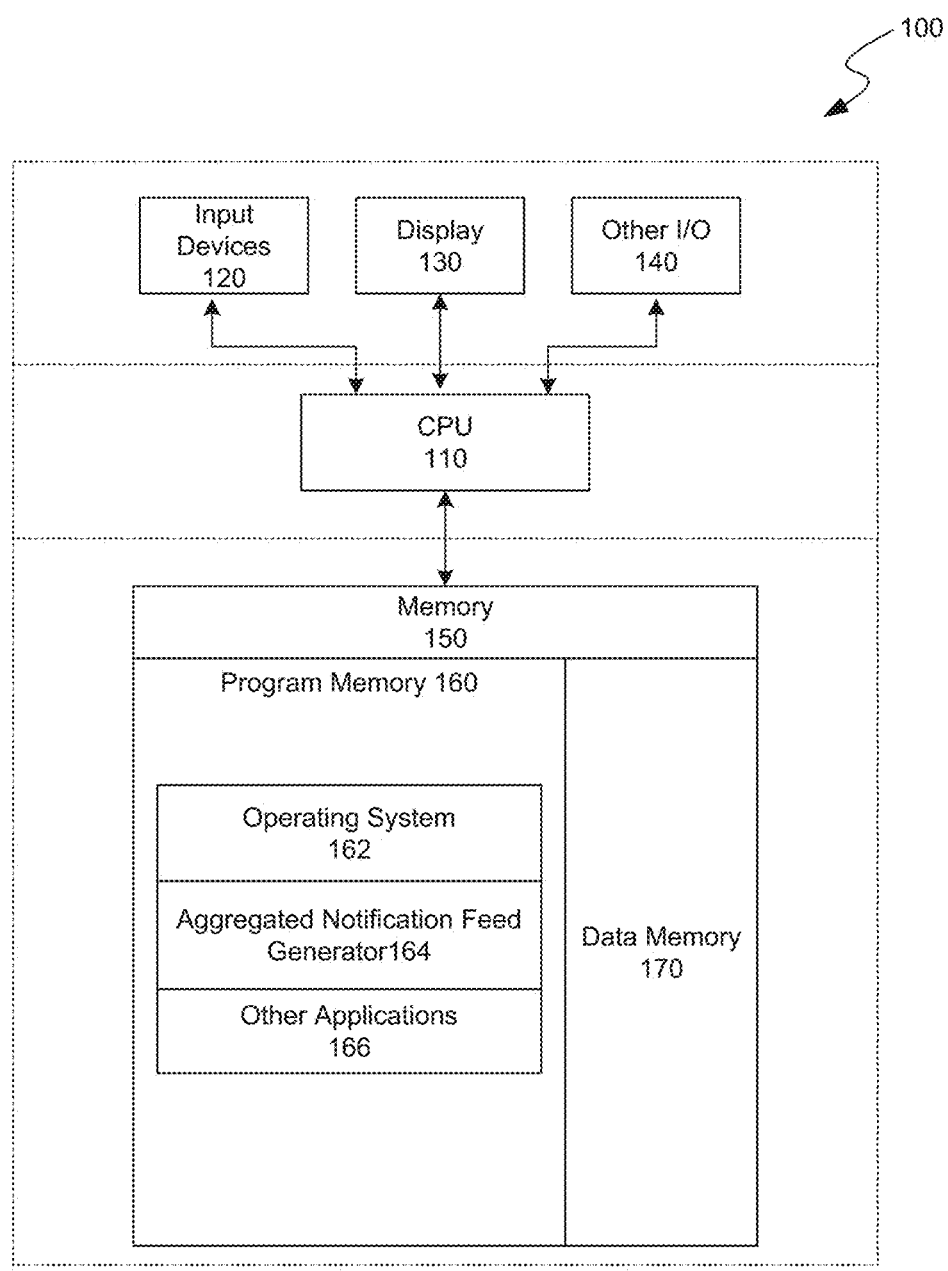
FIG. 1 is a block diagram illustrating an overview of devices on which some implementations can operate.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that generates an aggregated notifications feed. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, aggregated notification feed generator 164, and other application programs 166. Memory 150 can also include data memory 170 that can include notifications with corresponding parameters (e.g. timestamp, thread ID, notification ID, etc.), notification thread data, notification grouping rules, notification ordering rules, configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
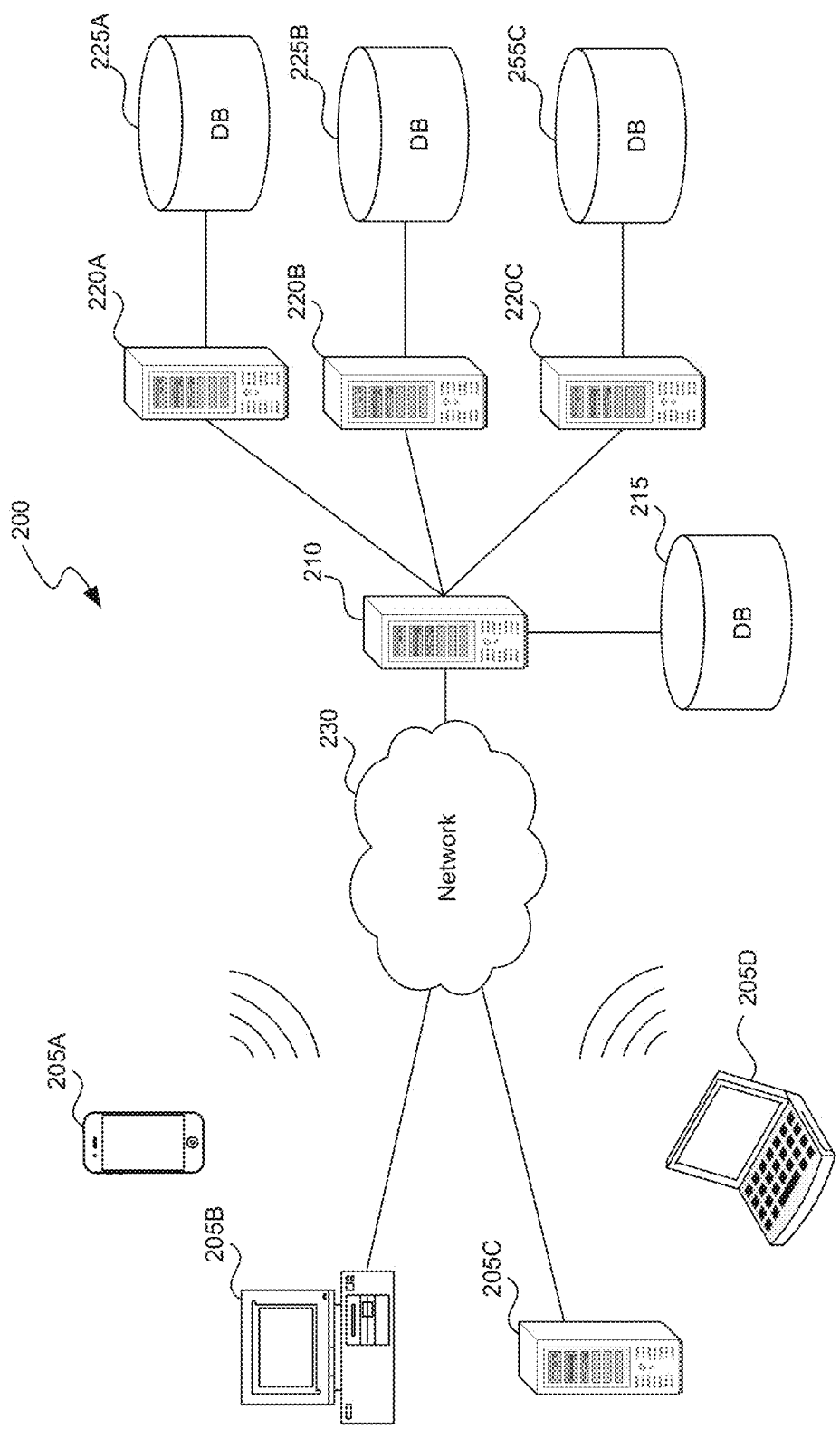
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as notifications with corresponding parameters (e.g. timestamp, thread ID, notification ID, etc.), notification thread data, notification grouping rules, notification ordering rules, configuration data, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

In some implementations, servers 210 and 220 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g. indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc.

Subjects and concepts, in the context of a social graph, comprise nodes that represent any person, place, thing, or idea.

A social networking system can enable a user to enter and display information related to the user's interests, age/date of birth, location (e.g. longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users; can enable a user to post a message to the user's wall or profile or another user's wall or profile; can enable a user to post a message to a group or a fan page; can enable a user to comment on an image, wall post or other content item created or uploaded by the user or another user, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, or an instant message external to but originating from the social networking system. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In at least one embodiment, users who belong to a common network are considered connected. For example, users who attend a common school, work for a common company, or belong to a common social networking system group can be considered connected. In at least one embodiment, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 3:
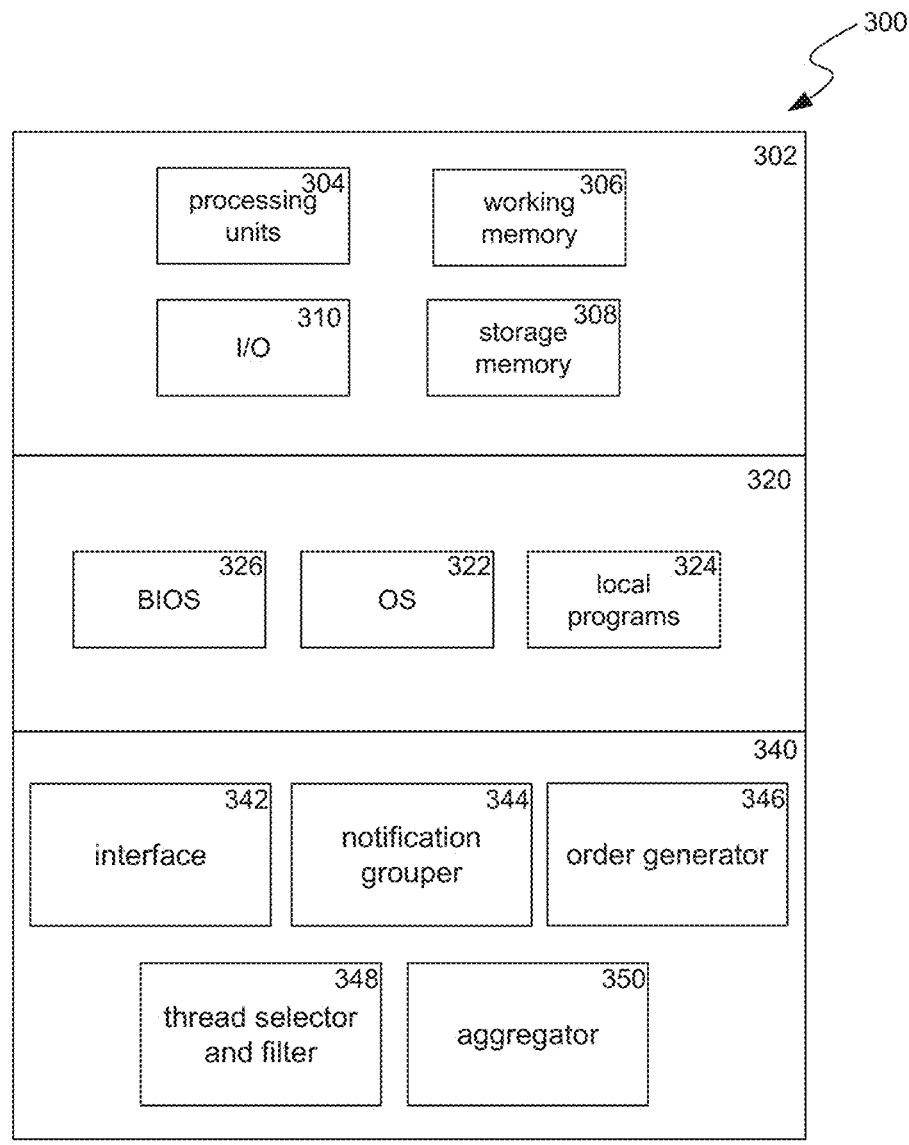
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include notification grouper 344, order generator 346, thread selector and filter 348, aggregator 350, and components which can be used for transferring data and controlling the specialized components, such as interface 342. In some implementations, components 300 can be in a computing system that is distributed across multiple computing devices or can be an interface to a server-based application executing one or more of specialized components 340.

Notification grouper 344 can receive notifications through interface 342, e.g. from a notifications database in storage memory 308; can receive through interface 342 notification thread data, e.g. from a thread database in storage memory 308; and can sort the received notifications into groups. In some implementations, notification grouper 344 can perform this sorting based on grouping rules. Grouping rules can map notifications into groups based on parameters associated with the notifications. In various implementations, notification parameters can define which thread the notification is a part of, a notification thread type for the thread that the notification is a part of, a time indicator (e.g. a timestamp), a notification ID, a notification type, or contextual information for the notification.

In some implementations, which thread the notification is a part of or what notification thread type a notification has can be based on the notification's type or contextual information. Some notifications can be mapped into a group based on their type. For example, a new post notification, can be mapped into a "new post" group based on having a "new post" type; a "mention" can be mapped into a "mentions" group based on having a "mention" type; a comment, reply, or other message, can be mapped into a "conversation" group based on having a "message" type; or other notifications, can be mapped into an "other" group based on not having a type mapped to a specific group. Some notifications can be mapped into multiple groups based on their type, and the notification's contextual information can determine which of these groups the notification belongs in. For example, a notification of a "like," can be mapped into both a "conversation" group and an "other" group. The notification can be in the "conversation" group if the notification's context indicates the "like" is part of a conversation, e.g. if the notification is a "like" on a content item that is part of a conversation, such as a reply to a comment. Alternatively, the notification can be in the "other" group if the notification's context does not indicate the "like" is part of a conversation. Grouping notifications by thread type is discussed in greater detail below in relation to FIG. 5.

Order generator 346 can generate an order among the set of notifications. In some implementations, this order is based on a time parameter associated with each of the notifications, e.g. ordering them in reverse chronological order. In some implementations, this order can be ordering the groups based on the notification within the group that is the most highly relevant (e.g. most recent). Ordering the groups based on the most relevant notification within the groups allows the resulting list of notification categories to be arranged such that notification categories with the most relevant notification are displayed before groups with less relevant notifications. Ordering the notification groups based on the most relevant notification within the groups is discussed in greater detail below in relation to FIG. 6A. In some implementations, the order among the notifications can be ordering the notifications within each group. Ordering the notifications within each group allows the resulting notification threads to be ordered within that group such that threads with the most highly relevant (e.g. most recent) notification is displayed before threads with less relevant notifications. Ordering the notifications within each group is discussed in greater detail below in relation to FIG. 6B. In some implementations, the ordering among the notifications can be both ordering the notification groups based on the most relevant notification within the groups and ordering the notifications within each group.

Thread selector and filter 348 can receive a the notifications grouped by notification grouper 344 and as ordered by order generator 346 and generate a list of notification threads by replacing each notification with an identifier for that notification's thread. Thread selector and filter 348 can then filter this list of notification threads so that each notification thread is only included once. In some implementations, this filtering can be performed by walking the list of notification threads in the order dictated by the order generator 346 and removing any notification thread that has already been seen during this walking of the list of notification threads. Applying thread selector and filter 348 can produce a remaining set of notification threads, grouped according to the category of the notification threads determined by notification grouper 344 and ordered by order generator 346. Selecting notification threads and filtering them are discussed in greater detail below in relation to FIG. 4.

Aggregator 350 can create an aggregated notifications feed by adding, to each group of notification threads, a title for the category of those notification threads. In some implementations, this aggregated notifications feed can be provided, e.g. through interface 342, to a client device, as part of a user interface having a list of notifications a user may want to view. In some implementations, the notification threads in this user interface can be organized under their corresponding notification thread category. In some implementations, the notification threads in this user interface can be actuated, e.g. as links, to display the set of notifications that correspond to that notification thread. In some implementations, the displayed set of notifications can include additional data, such as an icon for the notification type, a title of the notification, a summary or snippet of the notification, a summary or snippet of a content item the notification links to or is about, an indicator of whether the notification has been read, etc. An example user interface with an aggregated notifications feed is provided in relation to FIG. 7.

Those skilled in the art will appreciate that the components illustrated in FIGS. 1-3 described above, and in each of the flow diagrams and example discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
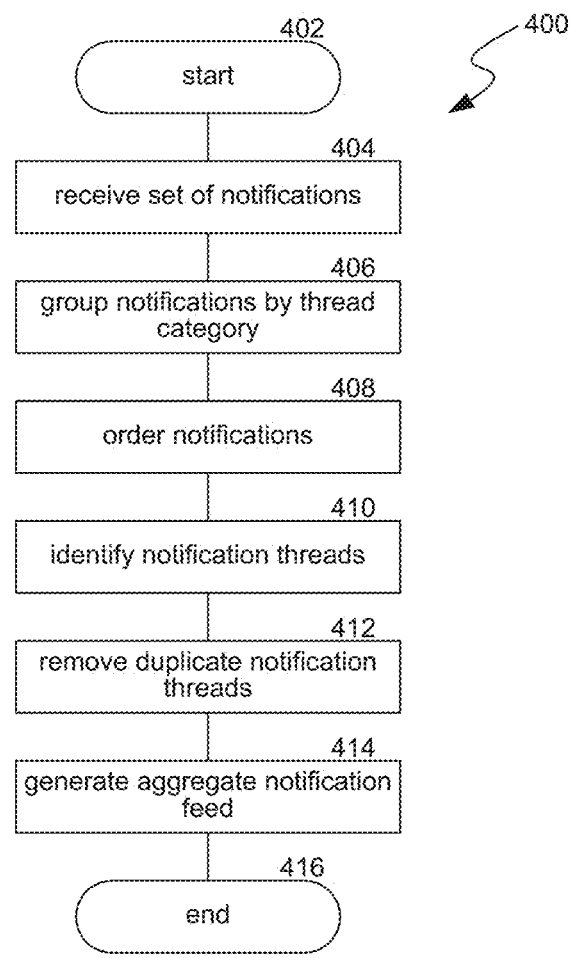
FIG. 4 is a flow diagram illustrating a process used in some implementations for generating an aggregated notifications feed.

FIG. 4 is a flow diagram illustrating a process 400 used in some implementations for generating an aggregated notifications feed. Process 400 begins at block 402 and continues to block 404. At block 404, process 400 can receive a set of notifications. The received set of notifications can be notifications for a current user, such as a user logged into a social networking system. In some implementations, the received set of notifications can be ordered, such as in chronological or reverse chronological order. In some implementations, the received notifications can include, or be otherwise associated with, parameters defining one or more of: a notification time, a notification type, notification content, a notification thread, a notification thread type, whether the notification has been previously provided or received by the current user, nodes or edges on a social graph the notification is associated with, or other contextual information for the notification.

At block 406, process 400 can group the notifications in the received set of notifications by notification thread category. In some implementations, process 400 can accomplish this grouping using a set of grouping rules. Process 400 can evaluate notification parameters such as the notification type, notification thread, or notification thread type against the grouping rules to determine which group each notification should be added to. In some implementations, the grouping rules specify that particular notifications corresponding to particular thread types should be grouped together. For example, the grouping rules can group notification that are part of conversation-type notification threads together, group notification that are part of new post-type notification threads together, group notification that are part of mention-type notification threads together, and group all other notifications together. Additional details regarding grouping notifications by thread category are provided below in relation to FIG. 5.

At block 408, process 400 can generate an order among the grouped notifications. In various implementations, generating this order can be a based on a time parameter (e.g. a timestamp) associated with each notification or a time parameter associated with at least one notification in each of the groups. In some implementations, generating this order can be a reverse chronological order. In various implementations, generating this order can be an order among the notifications within each group, an order among the groups based on the time parameter with the most recent time in each group, or both. Additional details regarding these types of orders are provided below in relation to FIGS. 6A and 6B. In some implementations, the order among the groups can be specified by preferences set by the current user or by a system administrator.

In some implementations, the order can be generated by a model trained to select notifications or notification groups. The model can be trained using a log of previous user activities. In various implementations, the log can be a log of activities of the current user or of a type of user that the current user matches (e.g. based on user characteristics or pre-defined user groupings). In some implementations, the log can include positive items for notifications or notification threads that were selected by a user and negative items for notifications or notification threads that were displayed to a user but were not selected or were selected after a threshold number of other notifications were selected. Training the model can include providing a representation of a notification or notification thread from the log to the model and adjusting the model parameters to increase the model's output value when the provided representation is from a positive item in the log and adjusting the model parameters to decrease the model's output value when the provided representation is from a negative item in the log. Applying the model to a new notification or notification thread, whether or not that new notification or notification thread was part of the training data, can produce a rank score from the model. The notifications within a grouping or the groupings corresponding to a notification thread can be ordered based on their rank score.

A "model," as used herein, refers to a construct that is trained using training data to make predictions or provide probabilities for new data items, whether or not the new data items were included in the training data. For example, training data can include items with various parameters and an assigned classification. A new data item can have parameters that a model can use to assign a classification to the new data item. As another example, a model can be a probability distribution resulting from the analysis of training data. Examples of models include: neural networks, support vector machines, decision trees, Parzen windows, Bayes, clustering, reinforcement learning, probability distributions, and others. Models can be configured for various situations, data types, sources, and output formats.

In some implementations, the model can be a neural network with multiple input nodes that receive representations of notifications or notification threads. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used as a rank score.

A neural network can be trained with supervised learning, where the training data includes the log of activities as input and a desired output, such as whether the corresponding notification or notification thread is positive or negative. Output from the model can be compared to the desired output for that notification or notification thread and, based on the comparison, the neural network can be modified, such as by changing weights between nodes of the neural network or parameters of the functions used at each node in the neural network. After applying each of the items in the training data and modifying the neural network in this manner, the neural network model can be trained to evaluate new notifications or notification threads.

At block 410, process 400 can identify a set of notification threads for the notifications in the received set of notifications. Process 400 can accomplish this by selecting the notification threads corresponding to each individual notification and replacing the notification in the grouped and ordered set of notifications with the corresponding notification thread. This replacing causes the resulting set of notification threads to be grouped and ordered in the same manner as the set of notifications. In some implementations, the notification threads can be selected from the parameters associated with the received notifications, whether those parameters are included with the received notifications or are retrieved from another source such as a table that matches notifications to notification threads.

At block 412, process 400 can filter the identified set of notification threads such that no notification thread is included more than once in the set of notification threads.

Process 400 can perform this filtering by creating an empty remaining set of notification threads and traversing the set of notification threads in the order determined at block 408, adding each notification thread to the remaining set if it is not already identified in the remaining set. For example, if the identified set of notification threads is: <conversations group: thread1, thread4, thread1>; <new posts group: thread5, thread7, thread3, thread5>; <mentions group: thread2, thread2, thread6>; and <other group: thread8, thread0>; the remaining set can be <conversations group: thread1, thread4>; <new posts group: thread5, thread7, thread3>; <mentions group: thread2, thread6>; and <other group: thread8, thread0>.

At block 414, process 400 can generate an aggregated notifications feed. The aggregated notifications feed can be the remaining set of notification threads identified at block 412. This aggregated notifications feed can be included in a user interface, such as the example aggregated notifications feed 802 in FIG. 8. In some implementations, the notification threads in the user interface can be actuated to display the set of notifications that are in the actuated notification thread. In some implementations, the notification threads in the user interface can be organized according to the groupings in the remaining set of notification threads. In some implementations, the groups of notification threads in the user interface can be labeled with the notification category for that notification thread type group. The user interface can be provided to a client device. Process 400 can then proceed to block 416, where it ends.

Figure 5:
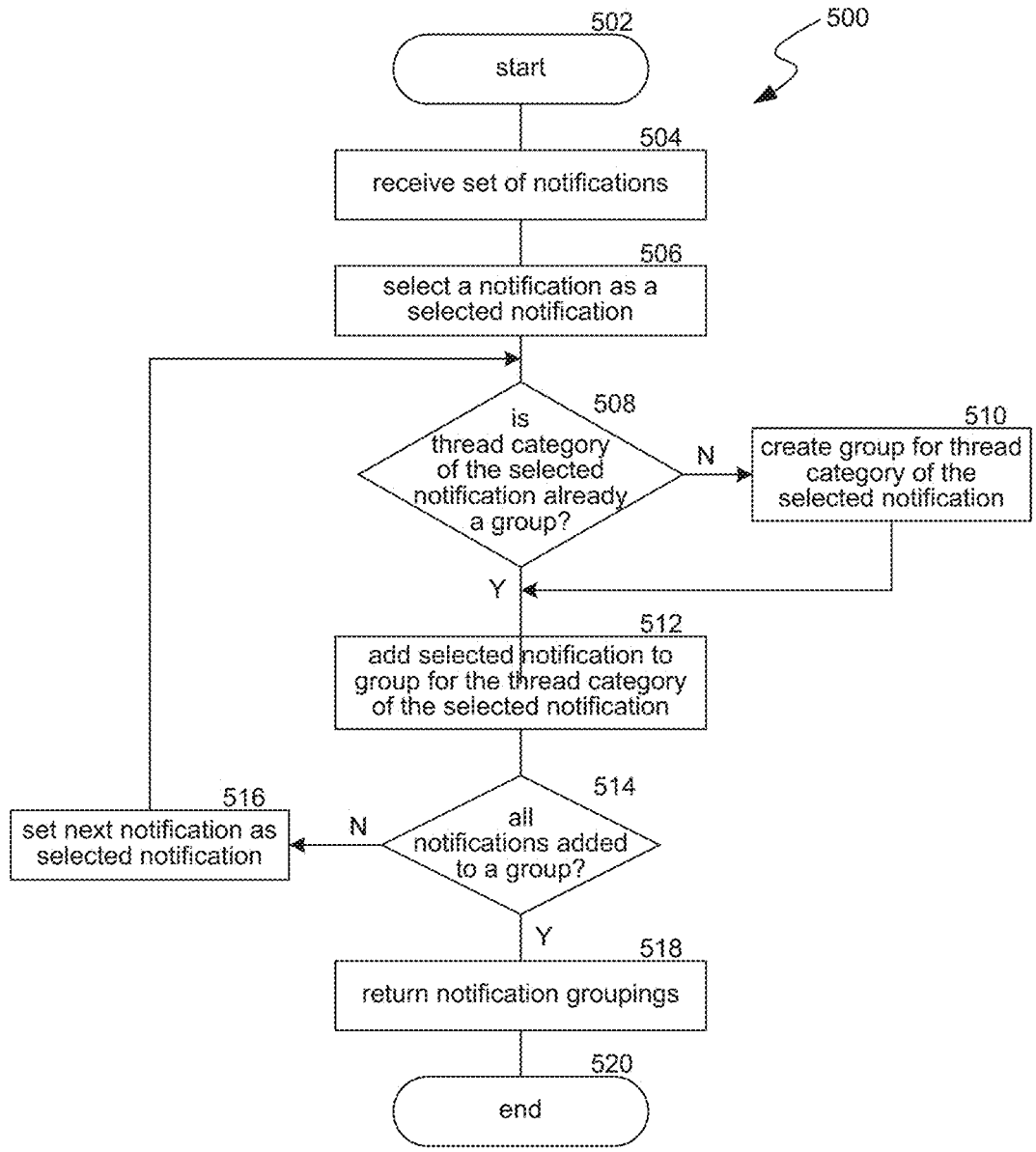
FIG. 5 is a flow diagram illustrating a process used in some implementations for grouping notifications by thread type.

FIG. 5 is a flow diagram illustrating a process 500 used in some implementations for grouping notifications by thread type. Process 500 begins at block 502 and continues to block 504. In some implementations, process 500 can be called from block 406 of process 400. At block 504, process 500 can receive a set of notifications. In some implementations, the received set of notifications can be provided from the set of notifications received at block 404 of process 400. At block 506, process 500 can select a notification from the received set of notifications as a selected notification to be operated on by the loop between blocks 508-516.

At block 508, process 500 can determine whether there is already a group created for a thread category identified for a notification thread of the selected notification. In some implementations, a specified set of groups can be automatically created. For example, when process 500 starts, it can create "Conversations, "New Posts," "Mentions," and "Others" groups. As another example, process 500 can create "Teams & Projects," "Announcements," "Open Discussions," and "Social & More" groups (see e.g. FIG. 8). In some implementations, process 500 can have access to a set of grouping rules, and the groups can be created based on a set of possible groups that the grouping rules can map notification threads into. If there is not already a group for the category of the notification thread of the selected notification, process 500 can proceed to block 510. This can occur, for example, when groups are created as needed, one for each category of the notification threads corresponding to the received set of notifications, and the selected notification is the first instance of a notification with a notification thread in a category. Otherwise, when there is already a group for the notification thread of the selected notification, process 500 can proceed to block 512.

At block 510, process 500 can create a group for the thread category of the notification thread corresponding to the selected notification. At block 512, process 500 can add the selected notification the group for the thread category of the notification thread corresponding to the selected notification. This can either be the group identified at block 508 if there was one, or the group created at block 510 if no group was identified at block 508.

At block 514, process 500 can determine whether all the notifications in the received set of notifications have been added to a group through the operations of the loop between blocks 508-516. If so, process 500 continues to block 518; if not, process 500 continues to block 516. At block 516, process 500 can set a next notification from the set of notifications as the selected notification to be operated on by the loop between blocks 508-516.

Once all the received notifications have been added to a group, at block 518 process 500 can return the notification groupings. Process 500 can then proceed to block 520, where it ends.

Figure 6A:
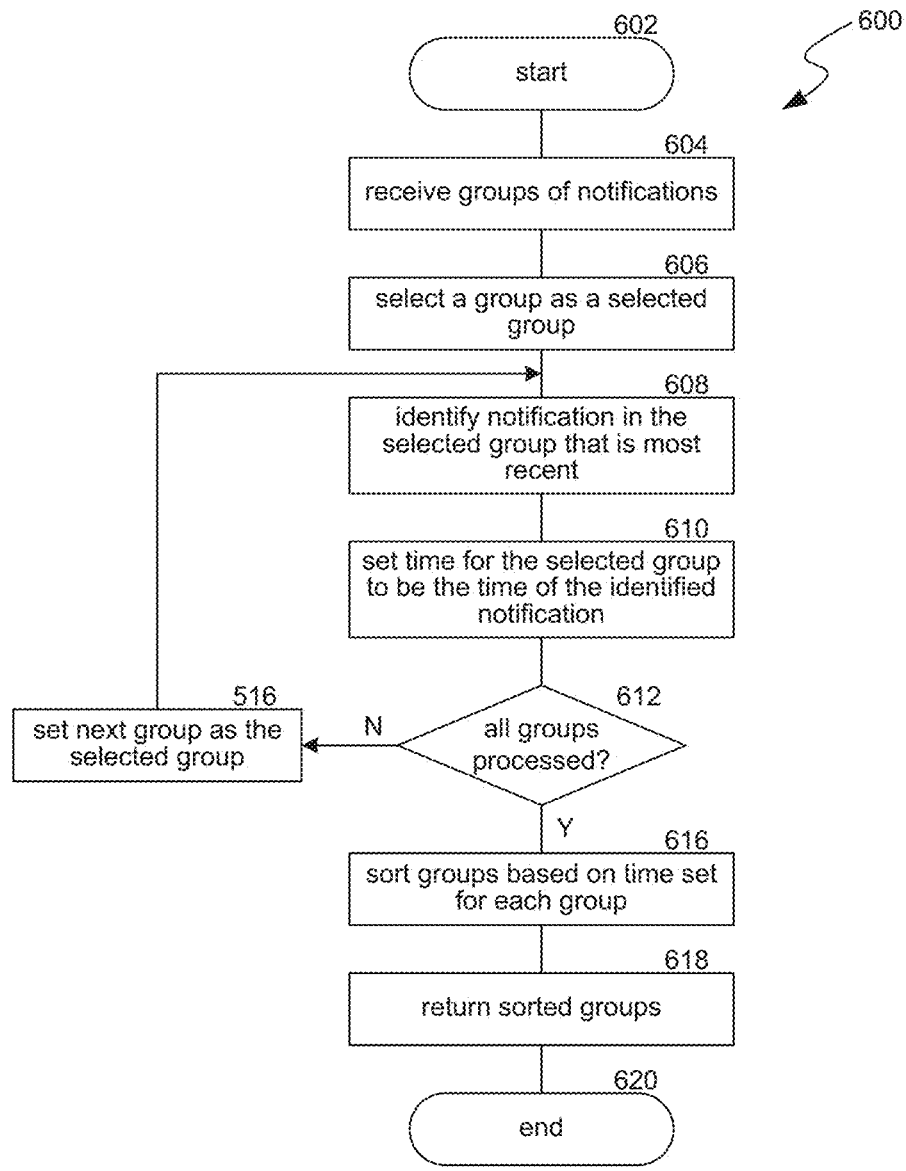
FIGS. 6A and 6B are a flow diagrams illustrating processes used in some implementations for ordering notifications.

FIG. 6A is a flow diagram illustrating a process 600 used in some implementations for ordering groups of notifications. Process 600 begins at block 602 and continues to block 604. In some implementations, process 600 can be called from block 408 of process 400. At block 604, process 600 can receive groups of notifications. In some implementations, process 600 can receive these groups as the groups determined at block 406 of process 400.

At block 606, process 600 can select one of the received notification groups as a selected group to be operated on by the loop between blocks 608-614. At block 608, process 600 can identify a notification in the selected group that is the most recent. Process 600 can accomplish this by traversing the notifications in the selected group and note which notification has the earliest timestamp. In some implementations, at block 608, process 600 can identify a notification from the selected group based on a characteristic other than time. For example, notifications may have an urgency ranking such as for notifications that relate to events that are happening soon, and process 600 can select the most urgent notification. As another example, notifications may have an importance value based on an expected affinity between the current user and another user or a content item, e.g. based on a number of hops between the current user and the other user or content item in a social graph. Process 600 can select the most important notification.

At block 610, process 600 can set a value (e.g. time) for the selected group based on the corresponding value for the notification identified in block 608. The value for the group can be a value that is not temporally based, such as the urgency ranking or importance value discussed for block 608.

At block 612, process 600 can determine whether all the notification groups in the received set of notification groups have been assigned a value through the processing of the loop between blocks 608-614. If so, process 600 continues to block 616; if not, process 600 continues to block 614. At block 614, process 600 can set a next group from the received set of notification groups as the selected group to be operated on by the loop between blocks 608-614.

At block 616, process 600 can sort the received groups based on the values set for each group at block 610. Ordering the groups in this manner can cause an aggregated notifications feed that uses this ordering to list the notification groups in a manner that may be helpful to a user. For example, if the characteristic used at block 608 is time, then the resulting group order will present groups with a more recent notification ahead of other groups. At block 618, process 600 can return the sorted groups. Process 600 can then proceed to block 620, where it ends.

Figure 6B:
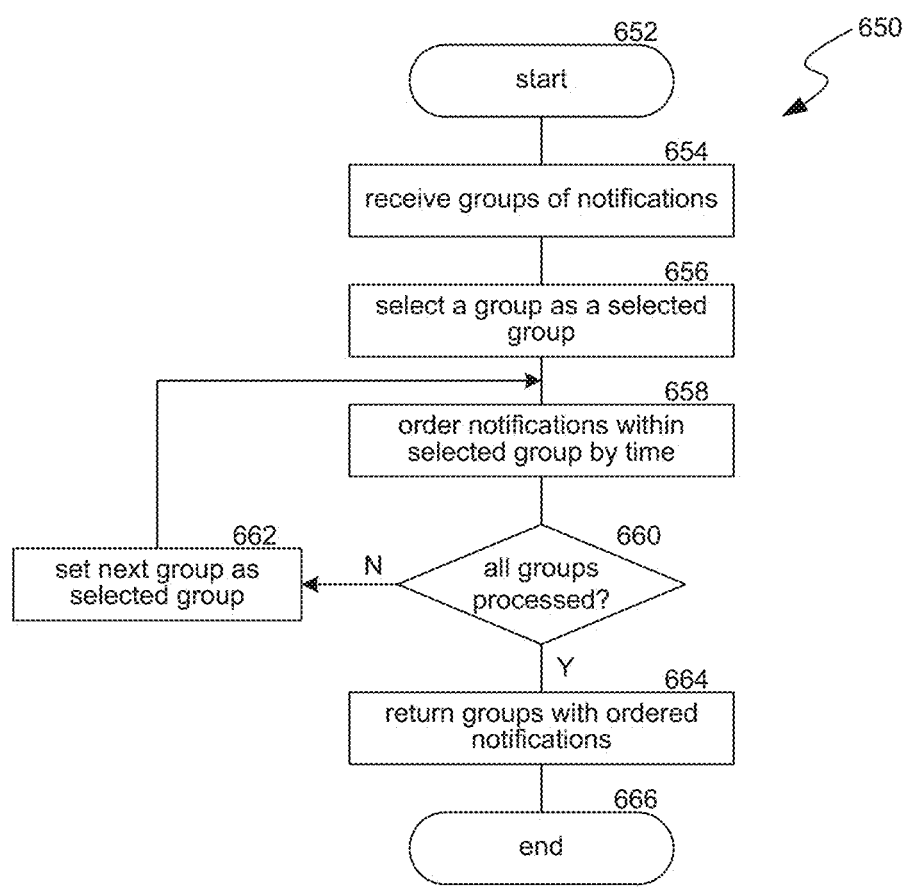

FIG. 6B is a flow diagram illustrating a process 650 used in some implementations for ordering notifications within groups. Process 650 begins at block 652 and continues to block 654. In some implementations, process 650 can be called from block 408 of process 400. At block 654, process 650 can receive groups of notifications. In some implementations, process 650 can receive these groups as the groups determined at block 406 of process 400.

At block 656, process 650 can select one of the received notification groups as a selected group to be operated on by the loop between blocks 658-662. At block 658, process 650 can sort the notifications in the selected group based on a characteristic, such as associated time values. In some implementations, at block 658, process 650 can sort notifications within the selected group based on a characteristic other than time. For example, notifications may have an urgency ranking such as for notifications that relate to events that are happening soon, that process 650 can sort by. As another example, process 650 can sort notifications using corresponding importance values. The importance values can be based on an expected affinity between the current user and another user or a content item, e.g. based on a number of hops between the current user and the other user or content item in a social graph. Ordering the groups in this manner can cause an aggregated notifications feed that uses this ordering to list the notification within a group in a manner that may be helpful to a user. For example, if the characteristic used is time, then the resulting order will present the notifications within each group with more recent notifications ahead of less recent notifications in that group.

At block 660, process 650 can determine whether all the notification groups in the received set of notification groups have been sorted through the processing of the loop between blocks 658-662. If so, process 650 continues to block 664; if not, process 650 continues to block 662. At block 662, process 650 can set a next group from the received set of notification groups as the selected group to be operated on by the loop between blocks 658-662. At block 664, process 650 can return the groups having their constitute notifications ordered. Process 650 can then proceed to block 666, where it ends.

Figure 7:
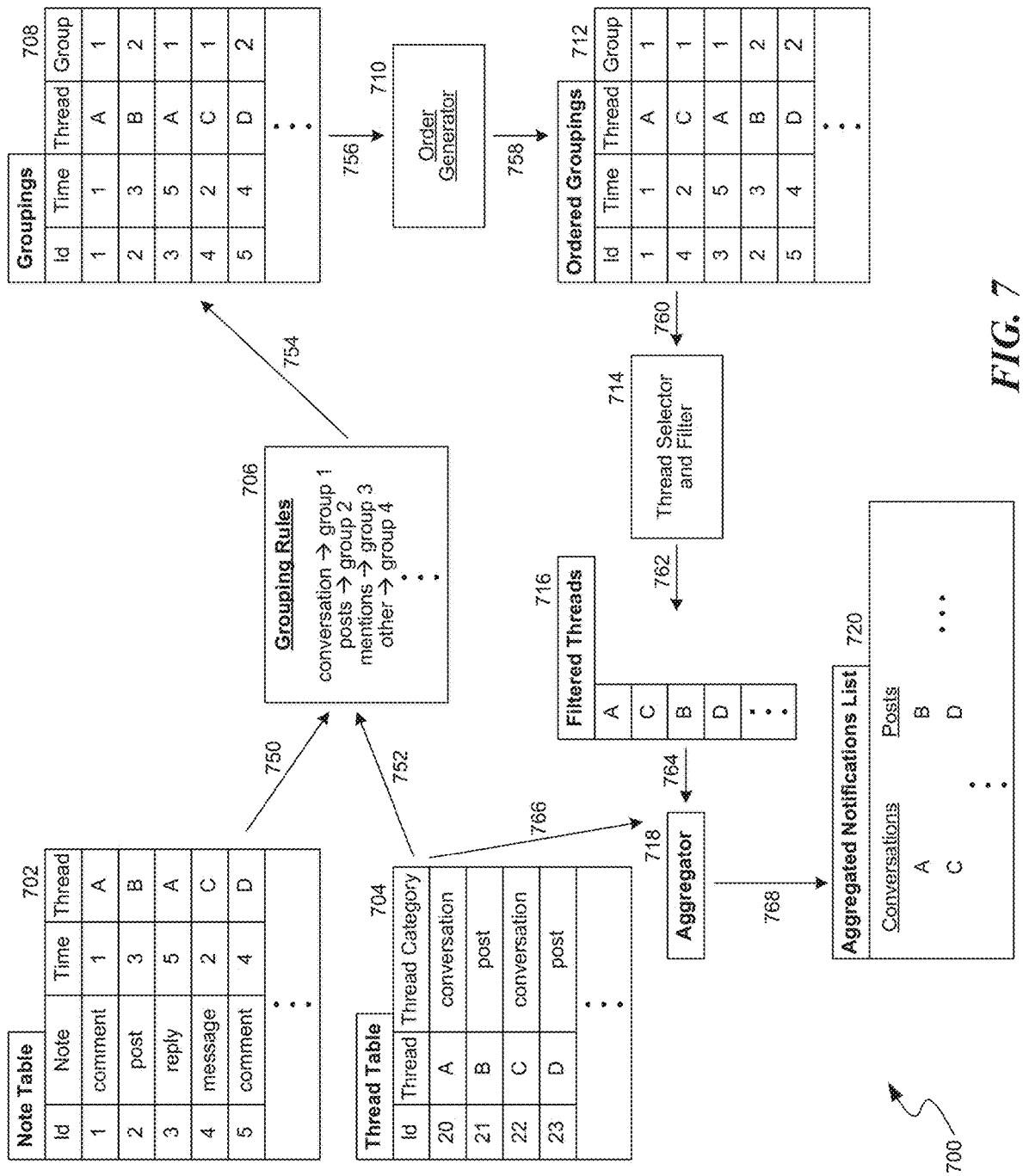
FIG. 7 is an example illustrating a process of generating an aggregated notifications feed.

FIG. 7 is an example 700 illustrating generating an aggregated notifications feed. Example 700 starts with Notification (abbreviated "Note" here) Table 702 and Thread Table 704 being provided at steps 750 and 752 to Grouping Rules 706. Notifications Table 702 includes multiple notifications, including the notifications shown with Ids. 1-5. Notification 1 is a comment that was made at time 1 in conversation thread A. Notification 2 is a post that was made at time 3 in post thread B. Notification 3 is a reply to the comment in notification 1 that was made at time 5 in conversation thread A. Notification 4 is a message that was made at time 2 in conversation thread C. Notification 5 is a comment on another post that was made at time 4 in post thread D.

Thread Table 704 includes multiple notification threads, including the threads shown with Ids. 20-23. The thread with Id. 20 is for thread A that has a thread category of conversation. The thread with Id. 21 is for thread B that has a thread category of post. The thread with Id. 22 is for thread C that has a thread category of conversation. The thread with Id. 23 is for thread D that has a thread category of post.

Grouping rules 706 include at least four rules, a first rule that groups notifications in a thread with a type "conversation" in group 1; a second rule that groups notifications in a thread with a type "post" in group 2; a third rule that groups notifications in a thread with a type "mention" in group 3; and a fourth rule that groups notifications with all other types in group 4.

At step 754, example 700 produces Groupings 708 by applying the first rule to the notifications with Ids. 1, 3, and 4 because they have threads A and C, which Thread Table 704 shows have a Conversation type matching the first rule, and by applying the second rule to the notifications with Ids. 2 and 5 because they have threads B and D, which Thread Table 704 shows have a Post type matching the second rule.

At step 756, example 700 provides the Groupings 708 to Order Generator 710. At step 758, Order Generator 710 produces Ordered Groupings 712. In example 700, Order Generator 710 produces ordered groupings by both ordering the notifications within each group and ordering the groups according the notification within each group that has the earliest time value.

At step 760, example 700 provides the Ordered Groupings 712 to Thread Selector and Filter 714. At step 762, Thread Selector and Filter 714 produces Filtered Threads 716. Thread Selector and Filter 714 produces filtered threads lists by replacing each line in the received Ordered Groupings 712 with the thread corresponding to that notification. In example 700, this thread is already identified in the Ordered Groupings in the "Thread" column. In some implementations, identifying the thread for a particular notification can include a database lookup in a table that joins notifications to threads. Thread Selector and Filter 714 can then remove from the list any threads that are included more than once. In example 700, this would be removing the thread "A" corresponding to the notification with Id. 3 because the notification with Id. 1 would have already caused thread "A" to be included.

At step 764, example 700 provides the Filtered Threads 716 to Aggregator 718, and at step 766, example 700 provides the Thread Table 704 to Aggregator 718. At step 768, Aggregator 718 produces Aggregated Notifications List 720. Aggregator 718 produces Aggregated Notifications List 720 by adding, to each group of filtered threads, a corresponding thread category from Thread Table 704. The Aggregated Notifications List 720 can then be used, e.g. in a user interface such as user interface 800, to show notifications grouped by thread category.

Figure 8:
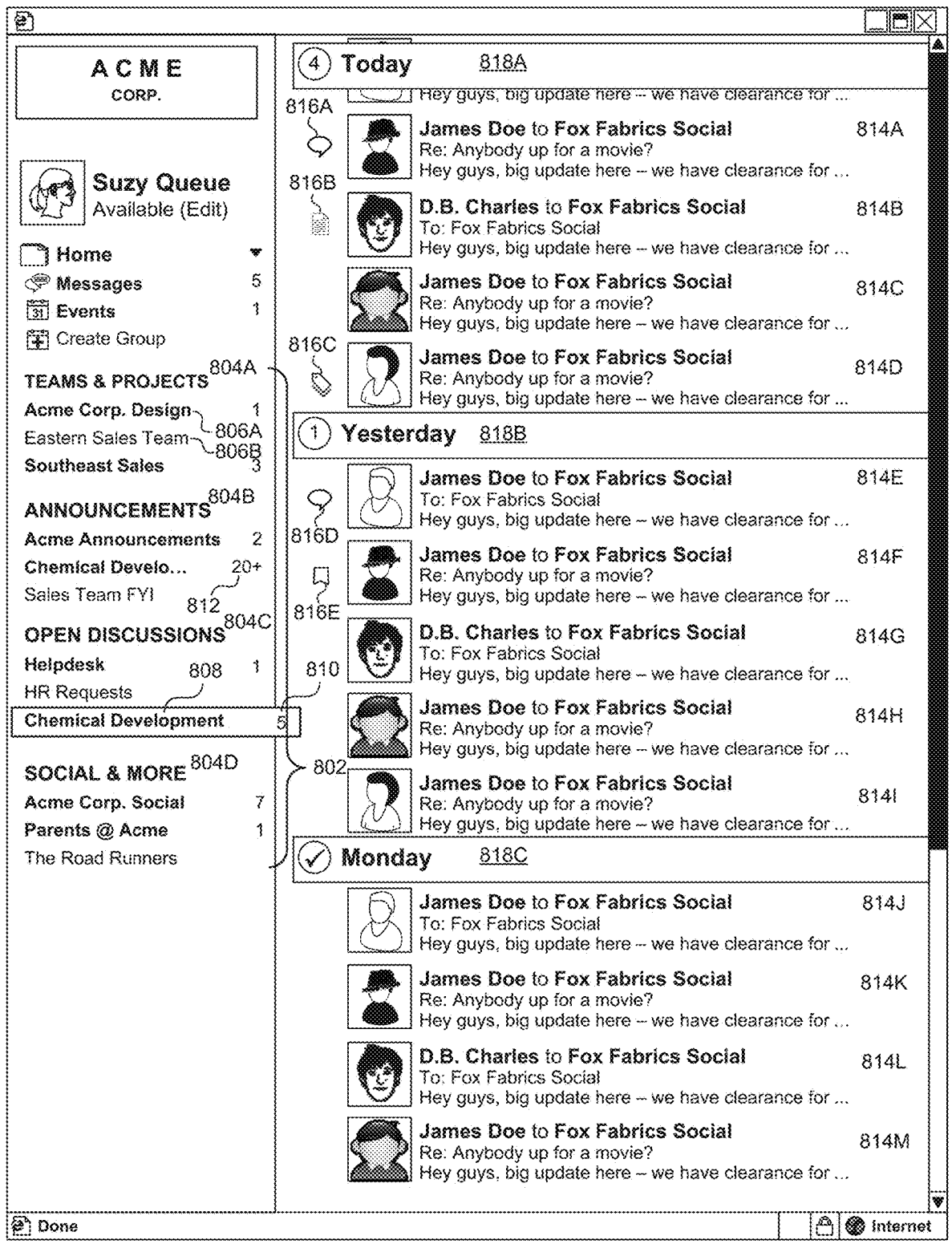
FIG. 8 is an example illustrating a user interface incorporating an aggregated notifications feed.

FIG. 8 is an example illustrating a user interface 800 incorporating an aggregated notifications feed 802. Aggregated notifications feed 802 includes thread categories 804A-D. Each thread category includes corresponding threads that are in that category. For example, thread category 804A includes notification threads 806A and 806B. Each notification thread can show a number of unread notifications in that thread, e.g. thread 808 has five unread notifications, shown at 810. Where there are more than a threshold number of unread threads, in this example 20, the unread notifications count 812 indicates that the threshold number has been surpassed. Each notification thread can be selected (e.g. clicked) by a user to display a corresponding list of notifications. For example, selecting notification thread 808 brings up notifications 814A-M. Displayed notifications 814 are ordered in reverse chronological order and are grouped by day under headers 818A-C. Displayed notifications 814 can include various notification details such as an avatar of an associated user, a title, or a summary of a content item associated with the notification. Displayed notifications can also have a notification icon 816A-E, indicating a type corresponding to that notification.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for automatically generating an aggregated notifications feed, the method comprising:
    obtaining a set of grouping rules that define notification categories of a social media network as a function of notification parameters, wherein the grouping rules specify that particular notifications corresponding to particular thread types should be grouped together;
    obtaining a set of notifications for a specified account, wherein each notification in the set of notifications is associated with parameters defining a notification time and a notification thread that the notification is in, each notification thread having a thread type;
    generating multiple intermediate groupings of notifications by evaluating one or more of the parameters for each notification, from the set of notifications, against the set of grouping rules, wherein:
        the multiple intermediate groupings are generated, at least in part, by evaluating the thread type of each notification; and
        the intermediate groupings comprise at least one of:
            a group for conversation type threads;
            a group for new post type threads; or
            a group for mention type threads;
        wherein the evaluation of the parameters against the set of grouping rules places each particular notification into a selected one of the intermediate groupings based on a correspondence between A) a notification category for the selected one of the intermediate grouping and B) the thread type for the notification thread defined in the parameters associated with that particular notification;
    generating an order among the set of notifications based on the notification time parameters associated with two or more of the notifications in the set of notifications;
    identifying a set of notification threads by selecting the notification thread, for each individual notification, defined in the parameter corresponding to that individual notification;
    producing the aggregated notifications feed that comprises a list of the notification threads from the set of notification threads,
        wherein each individual notification thread, in the aggregated notifications feed, is organized according to the notification category of the intermediate group that a notification in the individual notification thread is in; and
        wherein each specific notification thread, in the list of the notification threads, is actionable to retrieve notifications, of the set of notifications, that are in the specific notification thread; and
    providing the aggregated notifications feed to a client computing system.

2. The method of claim 1, wherein generating at least one of the multiple intermediate groupings comprises:
    determining that a grouping, with the notification category corresponding the thread type for the notification thread defined in the parameters associated with that particular notification, has not been created; and
    in response, creating the grouping with the notification category corresponding the thread type for the notification thread defined in the parameters associated with that particular notification.

3. The method of claim 1, wherein the intermediate groupings comprise: the group for conversation type threads, the group for new post type threads, the group for mention type thread, and a group for all other type threads.

4. The method of claim 1, wherein generating the order among the set of notifications comprises ordering the notifications within each intermediate grouping in reverse chronological order of the notification time parameter associated with each notification.

5. The method of claim 1, wherein generating the order among the set of notifications comprises:
- determining, for each particular intermediate grouping, a most recent notification in that particular intermediate grouping as the notification that is associated with a time parameter that indicates the most recent time, among the time parameters associated with notifications within that particular intermediate grouping; and
- ordering the intermediate groupings in reverse chronological order of the notification time parameter associated with the determined most recent notification for each particular intermediate grouping.

6. The method of claim 1, wherein generating the order among the set of notifications comprises applying a prediction model trained to select a notification ordering based on previously observed user interactions with notifications or notification threads.

7. The method of claim 6, wherein the training of the prediction model uses previously observed user interactions with notifications, by a user of the specified account.

8. The method of claim 6,
- wherein the training of the prediction model uses previously observed user interactions by multiple users identified, based on user characteristics, as being in a particular user category; and
- wherein the prediction model was chosen to generate the order among the set of notifications in response to a determination that, based on user characteristics of a user of the specified account, the user of the specified account is in the user category.

9. The method of claim 1, further comprising applying a filter, to the set of notification threads, that removes any notification threads that are included more than once in the set of notification threads.

10. A non-transitory computer-readable storage medium storing instructions that, when executed by a computing system, cause the computing system to perform operations for generating an aggregated notifications feed, the operations comprising:
- obtaining a set of notifications for a specified social media network account, wherein each notification in the set of notifications is associated with a notification thread that the notification is in, each notification thread having a thread type;
- grouping the set of notifications into intermediate groups by placing each particular notification into a selected one of the intermediate grouping based on a correspondence between A) a notification category for the selected one of the intermediate grouping and B) the thread type for the notification thread associated with that particular notification, wherein the intermediate groupings comprise at least one of:
  - a group for conversation type threads;
  - a group for new post type threads; or
  - a group for mention type threads;
- identifying a set of notification threads by selecting the notification thread, for each individual notification, associated with that individual notification;
- removing, from the set of notification threads, any notification threads that are included more than once in the set of notification threads to produce a remaining set of notification threads;
- generating the aggregated notifications feed comprising a list of the notification threads from the remaining set of notification threads,
  - wherein each individual notification thread, in the aggregated notifications feed, is organized according to the notification category of the intermediate group that a notification in the individual notification thread is in; and
- providing the aggregated notifications feed to a client computing system.

11. The non-transitory computer-readable storage medium of claim 10, wherein the operations further comprise generating an order among the set of notifications by:
- determining, for each particular intermediate grouping, a most recent notification in that particular intermediate grouping, wherein the determined notification is the notification that is associated with a time parameter that indicates the most recent time among time parameters associated with the notifications within that particular intermediate grouping; and
- ordering the intermediate groupings in reverse chronological order of the time parameter associated with the determined most recent notification for each particular intermediate grouping.

12. The non-transitory computer-readable storage medium of claim 10, wherein the operations further comprise generating an order among the set of notifications by applying a prediction model trained to select a notification ordering based on previously observed user interactions with notifications or previously observed user interactions with notification threads.

13. The non-transitory computer-readable storage medium of claim 12, wherein the training of the prediction model tailors the prediction model to a used of the specified account by training based on previously observed user interactions, by the user of the specified account.

14. The non-transitory computer-readable storage medium of claim 12,
- wherein the training of the prediction model tailors the prediction model to a particular user allegory by training based on previously observed user interactions by multiple users identified, based on user characteristics, as being in the particular user category; and
- wherein the prediction model was chosen to generate the order among the set of notifications in response to a determination that, based on user characteristics of a user of the specified account, the user of the specified account is in the user category.

15. A system for generating an aggregated notifications feed, the system comprising:
- one or more processors;
- a memory;
- an interface configured to receive a set of notifications for a specified social media network account, wherein each notification in the set of notifications is associated with a notification thread that the notification is in, each notification thread having a thread type;
- a notification grouper configured to group the set of notifications into intermediate groups by placing each particular notification into a selected one of the intermediate groupings based on a correspondence between A) a notification category for the selected one of the intermediate grouping and B) the thread type for the notification thread associated with that particular notification, wherein:
  - the multiple intermediate grouping are generated, at least in part, by evaluating the thread type of each notification; and
  - the intermediate groupings comprise at least one of:
    - a group for conversation type threads;
    - a group for new post type threads; or
    - a group for mention type threads; and an aggregator configured to generate the aggregated notifications feed comprising the notification threads associated with each individual notification in the set of notifications,
- wherein each individual notification thread, in the aggregated notifications feed, is organized according to the notification category of the intermediate group that a notification in the individual notification thread is in;
- wherein the interface is further configured to incorporate the aggregated notifications feed into a user interface.

16. The system of claim 15 further comprising a thread selector and filter configured to identify the notification threads by selecting the notification thread, for each individual notification, associated with that individual notification.

17. The system of claim 16, wherein the thread selector and filter is further configured to remove, from the set of notification threads, any notification threads that are included more than once in the set of notification threads.

18. The system of claim 15 further comprising an order generator configured to order the notifications within each intermediate grouping in reverse chronological order of each notification.

19. The system of claim 15 further comprising an order generator configured to
- determine, for each particular intermediate grouping, a most recent notification in that particular intermediate grouping; and
- order the intermediate groupings in reverse chronological order of the determined most recent notification for each particular intermediate grouping.

20. The system of claim 15 further comprising an order generator configured to:
- order the notifications within each intermediate grouping in reverse chronological order of each notification;
- determine, for each particular intermediate grouping, a most recent notification in that particular intermediate grouping; and
- order the intermediate groupings in reverse chronological order of the determined most recent notification for each particular intermediate grouping.

* * * * *

UNITED STATES PATENT AND TRADEMARK OFFICE
CERTIFICATE OF CORRECTION

PATENT NO. : 10,516,639 B2
APPLICATION NO. : 15/642250
DATED : December 24, 2019
INVENTOR(S) : Alon Schwarz et al.

Page 1 of 1

It is certified that error appears in the above-identified patent and that said Letters Patent is hereby corrected as shown below:

In the Claims

In Column 16, Line 62, Claim 3, delete "thread," and insert -- threads, --, therefor.

Signed and Sealed this
Seventh Day of April, 2020

Andrei Iancu
*Director of the United States Patent and Trademark Office*